Sept. 19, 1961 C. D. COXE 3,000,339
BRAZING FILLER METAL
Filed May 7, 1958

INVENTOR.
BY Charles D. Coxe
ATTORNEYS.

3,000,339
BRAZING FILLER METAL
Charles D. Coxe, Fairfield, Conn., assignor to Handy & Harman, New York, N.Y., a corporation of New York
Filed May 7, 1958, Ser. No. 733,555
6 Claims. (Cl. 113—110)

This invention relates to brazing alloys and has for its object the provision of a new brazing alloy composition (hereinafter referred to as "brazing filler metal") comprising a porous metallic skeletal lamellar structure and a commingled brazing metal or alloy (hereinafter called "brazing metal") filling the interlamellar spaces of the lamellar structure. The skeletal metal structure is a particulate coherent porous mass, the interlamellar spaces of which are filled with the brazing metal, which has little or no capacity to dissolve the skeletal metal. The brazing filler metal is preferably in the form of wrought wire, strip or sheet, and has the particles of skeletal metal flattened or elongated as a result of rolling or other mechanical working operation.

When the brazing filler metal is to be used in the brazing of ferrous alloys, such as stainless steel, the skeletal metal is a metal of the group consisting of iron, cobalt, nickel, and their base metal alloys. The skeletal metal may be ordinary commercially available powdered metal varying from practically pure metal to metal containing minor amounts of impurities and alloying constituents which do not reduce the ductility or increase its solubility in the brazing metal. The iron powder may be prepared by the gaseous reduction of iron oxide or by the electrolytic or carbonyl processes. The cobalt and nickel may be prepared, for example, by hydrogen reduction or by the electrolytic process.

The brazing metal may be silver or copper or their alloys as will be described more fully hereinafter.

In forming the brazing filler metal of the invention, the skeletal metal in a powdered or granular state, without being compressed, is heated to a sintering temperature below its melting point to form a porous coherent skeletal structure. The brazing metal is applied to the porous skeletal metallic structure in a liquid state to fill the pores thereof resulting in a composite metal body which is rolled or otherwise mechanically worked to form thin structures such as wire, strip or sheets in which the particles of skeletal metal are flattened and elongated giving a generally laminar brazing filler metal consisting of filler metal as one component and brazing metal as the other component.

The brazing filler metal provides a collapsible skeletal lamellar metallic structure which holds the brazing metal in its interlamellar spaces. When the brazing filler metal is heated to a temperature above the melting point of the brazing metal while under pressure, the skeletal metal collapses and the brazing metal is expressed at the pressure application points, while at non-pressure points, the brazing metal will tend to remain absorbed in the skeletal metal and stay in place. Run-off of the brazing metal is thus minimized.

The brazing filler metal of the invention has general utility and is advantageously useful in the brazing of inaccessible parts, such as stainless steel honeycomb panels for use in aircraft.

When the skeletal metal is iron, silver or copper alone may be used and these metals may be practically pure, but in the case of relatively pure silver it is preferred to use silver containing from 0.2% to 4% of lithium. The following are typical alloys that may be used with iron as the skeletal metal:

Ag 72%, Cu 28%
Ag 50%, Cu 15.5, Zn 16.5%, Cd 18%
Ag 40%, Cu 60%
Ag 90%, Pd 10%
Ag 92%, Cu 7.3%, Li 0.2%

The following are typical alloys that may be used with nickel as the skeletal metal:

Ag 90%, Pd 10%
Ag 92.5%, Cu 7.3%, Li 0.2%

The following are typical alloys that may be used with cobalt as the skeletal metal:

Ag 72%, Cu 28%
Ag 50%, Cu 15.5, Zn 16.5%, Cd 18%
Ag 90%, Pd 10%
Ag 92.5%, Cu 7.3%, Li 0.2%

Figure 3:
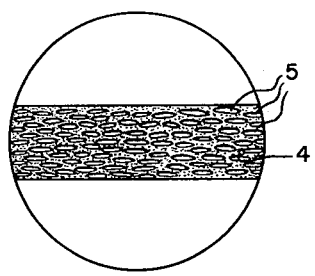
FIGS. 3 and 4 are transverse and longitudinal views respectively of the sponge and alloy metal of FIG. 2 after rolling.
Figure 4:
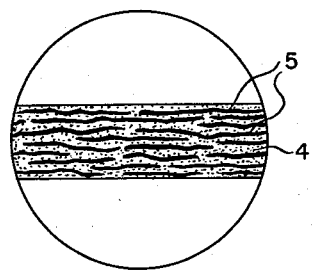
Figure 5:
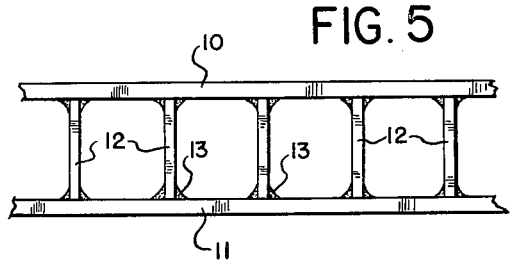
Figure 6:
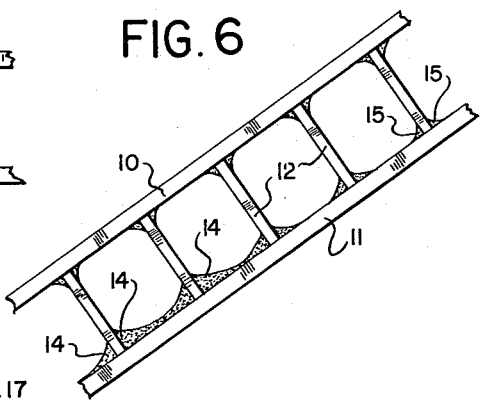
Figure 7:
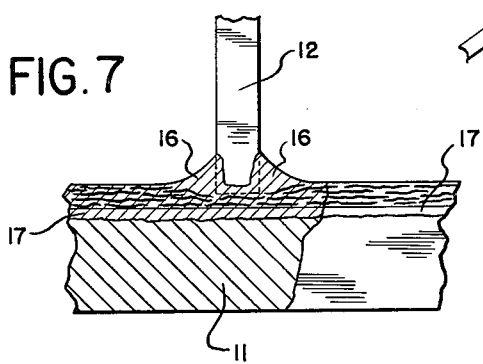

FIGS. 5 and 6 illustrate typical stainless steel honeycomb members in the horizontal and inclined positions respectively after brazing with conventional brazing alloys, and FIG. 7 is an enlarged section of a brazed joint in a structure similar to that of FIGS. 5 and 6, using the brazing filler metal of FIGS. 3 and 4.

Figure 1:
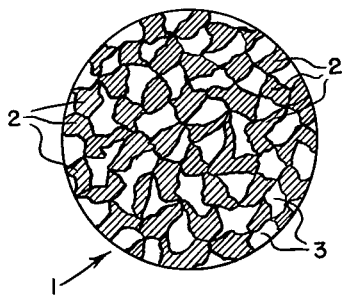
FIG. 1 is an enlargement of a typical skeletal metal sponge.

In forming the porous mass of sintered skeletal metal structure of FIG. 1, the skeletal metal 1, for example powdered iron, is placed in a flat mold, say, about ½ inch or more thick and several inches wide and long depending on the dimensions of the rolled strip, and is heated in hydrogen gas at a temperature of from 1750° F. to 2100° F. to sinter the particles 2 in a solid state without fusion and without pressing. This results in bonding of the contacting particles 2 and leaves a porous mass having from 25% to 75% porosity, the preferred porosity being about 50%.

As shown in FIG. 1 the dark areas represent the skeletal metal particles 2 which are sintered together and the light areas 3 represent interconnected pore areas.

Figure 2:
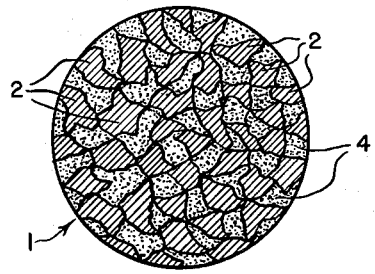
FIG. 2 is an enlargement of the skeletal metal sponge of FIG. 1 having the interstices filled with brazing metal.

An amount of brazing metal the volume of which is equal to the pore spaces 3 (FIG. 1) is placed on or under the cake of coherent sponge skeletal metal 1 and the contacting metals are heated to about 1700° F. in hydrogen to melt the brazing metal which then infiltrates the pores 3. As shown in FIG. 2, the brazing metal 4 has filled the pores 3. The fluid sponge bar or plate is rolled by conventional processes to strip in the order of 0.003 inch thick, which flattens and elongates the particles of skeletal metal 5 as shown in FIGS. 3 and 4. It is interesting to note that whereas the skeletal structures of FIG. 1 and FIG. 2 are inherently difficult to compress, the structures of FIG. 3 and FIG. 4 are easily compressible (when the brazing alloy is in the molten state) because the skeleton walls are long and thin whereas before rolling the skeleton walls were essentially equiaxed grains of solid metal.

FIGS. 5 and 6 illustrate typical stainless steel honeycomb panel structures for use in aircraft having the top and bottom face sheets 10 and 11 respectively which are held in spaced apart relation by the cell walls 12 of the panel.

These typical structures which are difficult to braze due to inaccessibility of the parts are brazed by placing sheets or strips of the brazing metal on the sheets 10 and 11 and then securing the cell walls in position. The inside of the panel is evacuated and this applies pressure between the sheets and cell walls. The panel is placed in a furnace and heated at a temperature that will melt the brazing metal. The panel of FIG. 5 was heated while in a horizontal position using conventional brazing metal, and the brazing metal fillets 13 were uniformly formed. The panel of FIG. 6 was heated while in an inclined position using a conventional brazing alloy and the fillets 14 at the left are heavier than the fillets 15 at the right due to run-down of the liquid brazing metal. This run-down of the brazing metal is one objection in the present practices that the brazing filler metal of the invention overcomes.

When a sheet of brazing filler metal of the invention is used in such structures as that of FIG. 5 and heated as described in either the horizontal or inclined position, the resulting brazed connections appear as illustrated in FIG. 7. In view of the compressibility of the sheet of brazing filler metal when the brazing metal is liquid, the cell walls 12 become pressed into near contact with the sheets 10 and 11. The brazing metal is expressed from the area between the walls 12 and sheet 11 and forms the fillets 16. In the case where nickel is the skeletal metal and a silver base alloy is the braze metal, when the braze metal is molten, nickel will diffuse through the molten braze metal from the skeletal metal to the structural material 11 being joined and there form a nickel-rich diffusion layer 17 at the surface of the structural material being joined. This nickel-rich diffusion layer results in increased corrosion resistance, particularly where the structural material is an iron-chromium alloy without nickel.

I claim:

1. A brazing filler metal consisting of a metallic skeletal lamellar structure and a brazing metal filling the interlamellar spaces of the lamellar structure, said metallic skeletal lamellar structure comprising many cohering, generally parallel laminar particles having a length substantially greater than their thickness, said laminar particles being composed of a high temperature melting metal selected from the group consisting of iron, cobalt and nickel and their base metal alloys, which is substantially insoluble in the brazing metal at the fusion temperature of the brazing metal, said brazing metal having a substantially lower melting temperature than said skeletal metal.

2. A brazing filler metal containing a metallic skeletal lamellar structure selected from the group consisting of iron, cobalt, and nickel and their base metal alloys and a brazing metal which is sparingly soluble in the skeletal metallic structure, has a substantially lower melting point than the skeletal metal and is selected from the group consisting of silver and copper and their alloys, said metallic skeletal lamellar structure enclosing many elongated and thin interconnected spaces filled with the brazing metal, said structure being readily collapsible under light pressure when said brazing metal is molten, and said filler metal being capable of freely expressing said brazing metal from said skeletal lamellar structure when compressed.

3. The brazing filler metal as defined in claim 2 wherein the brazing metal is a metal of the group consisting of copper and copper alloys containing more than 50% copper.

4. The brazing filler metal as defined in claim 2 in which the brazing metal is silver containing a small amount of lithium.

5. The brazing filler metal as defined in claim 2 wherein the brazing metal consists of an alloy containing more than 50% silver, together with copper and lithium.

6. The brazing filler metal as defined in claim 5 in which the brazing metal consists of an alloy of approximately 92.3% silver, 7.3% copper, and 0.2% lithium.

References Cited in the file of this patent

UNITED STATES PATENTS

| | | |
|---|---|---|
| 2,196,304 | Hensel et al. | Apr. 9, 1940 |
| 2,196,307 | Hensel et al. | Apr. 9, 1940 |
| 2,422,439 | Schwarzkopf | June 17, 1947 |
| 2,431,611 | Durst | Nov. 25, 1947 |
| 2,741,932 | Whitney et al. | Apr. 17, 1956 |
| 2,793,115 | Bredz et al. | May 21, 1957 |
| 2,861,327 | Bechtold et al. | Nov. 25, 1958 |